United States Patent
Komura et al.

(10) Patent No.: US 8,149,654 B2
(45) Date of Patent: Apr. 3, 2012

(54) WAVE GUIDE THAT ATTENUATES EVANESCENT LIGHT OF HIGHER ORDER TM MODE

(75) Inventors: Eiji Komura, Tokyo (JP); Shinji Hara, Tokyo (JP); Seiichi Takayama, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 98 days.

(21) Appl. No.: 12/729,560

(22) Filed: Mar. 23, 2010

(65) Prior Publication Data

US 2011/0235478 A1 Sep. 29, 2011

(51) Int. Cl.
*G11B 11/00* (2006.01)

(52) U.S. Cl. ............... 369/13.33; 369/13.13; 360/59

(58) Field of Classification Search .......... 369/13.33, 369/13.13, 13.32, 13.02, 112.09, 112.14, 369/112.21, 112.27; 360/59; 385/129, 31, 385/88–94; 205/201.3, 201.5
See application file for complete search history.

(56) References Cited

U.S. PATENT DOCUMENTS

| | | | |
|---|---|---|---|
| 6,795,380 B2 * | 9/2004 | Akiyama et al. ........... 369/13.33 |
| 7,010,183 B2 | 3/2006 | Estes et al. |
| 7,330,404 B2 | 2/2008 | Peng et al. |
| 7,440,660 B1 * | 10/2008 | Jin et al. ........................... 385/43 |
| 7,454,095 B2 | 11/2008 | Baehr-Jones et al. |
| 7,558,306 B2 | 7/2009 | Watanabe et al. |
| 7,580,602 B2 * | 8/2009 | Itagi et al. ....................... 385/37 |
| 7,961,417 B2 * | 6/2011 | Seigler et al. ................... 360/59 |
| 2008/0002298 A1 | 1/2008 | Sluzewski |
| 2008/0204916 A1 | 8/2008 | Matsumoto et al. |
| 2011/0176398 A1 * | 7/2011 | Tanaka et al. ............. 369/13.33 |
| 2011/0205660 A1 * | 8/2011 | Komura et al. ................. 360/59 |
| 2011/0216635 A1 * | 9/2011 | Matsumoto ............... 369/13.33 |
| 2011/0222184 A1 * | 9/2011 | Komura et al. ................. 360/59 |
| 2011/0228653 A1 * | 9/2011 | Shimazawa et al. ....... 369/13.32 |

FOREIGN PATENT DOCUMENTS

JP   A-2000-101193   4/2000

* cited by examiner

*Primary Examiner* — Tan X Dinh
(74) *Attorney, Agent, or Firm* — Posz Law Group, PLC

(57) ABSTRACT

A waveguide has a core through which laser light can propagate in a TM mode, that has a rectangular cross section perpendicular to a propagative direction of the laser light, and through which the laser light can propagate in a fundamental mode in which only one portion exists on the cross section of the core where a light intensity of the laser light becomes maximal, and a higher order mode in which two or more portions exist where the light intensity becomes maximal, a clad surrounding the core, and a light absorbing element in the clad, and wherein a distance between the light absorbing element and the core is shorter than a penetration length of evanescent light in the higher order mode, but is longer than a penetration length of evanescent light in the fundamental mode.

14 Claims, 13 Drawing Sheets

WAVE GUIDE THAT ATTENUATES EVANESCENT LIGHT OF HIGHER ORDER TM MODE

BACKGROUND OF THE INVENTION

1. Field of the Invention

The present invention relates to a wave guide (or waveguide) and a thermally-assisted magnetic recording element using this waveguide.

2. Description of the Related Art

Recently, in a magnetic recording device, such as a hard disk device, performance improvement of a thin film magnetic head and a magnetic recording medium is in demand in association with high recording density. As the thin film magnetic head, a combination type thin film magnetic head is widely used, where a reproducing head having a magneto resistive effect element (hereafter, also referred to as magneto resistive (MR) element) for reading, and a recording head having an inducible electromagnetic conversion element (magnetic recording element) for writing are laminated onto a substrate. In a hard disk device, the thin film magnetic head is placed in a slider that flies slightly above the surface of the magnetic recording medium.

A magnetic recording medium is a discontinuous medium where magnetic micro particles are assembled, and each magnetic micro particle has a single-domain structure. In this magnetic recording medium, one recording bit is composed of a plurality of magnetic micro particles. In order to enhance the recording density, asperity of the boundary between adjacent recording bits has to be small, which means that the micro particles have to be small. However, if the magnetic micro particles are decreased in size, thermal stability of magnetization of the magnetic micro particles is reduced. In order to solve this problem, it is effective to increase anisotropic energy of the magnetic micro particles. However, if the anisotropic energy of the magnetic micro particles is increased, coercive force of the magnetic recording medium becomes great and it becomes difficult to record information in the existing magnetic head. Such a trilemma exists in conventional magnetic recording, which is a great obstacle to increasing the recording density.

As a method for solving this problem, the method of so-called thermal assisted magnetic recording (or thermally-assisted magnetic recording) is proposed. In this method, a magnetic recording medium having great coercive force is used, and a magnetic field and heat are simultaneously applied to a portion where information is recorded in the magnetic recording medium. This causes a rise of the temperature in the portion where the information is recorded and a reduction of the coercive force, and then information is recorded.

In the thermally assisted magnetic recording, a method using near field light is known as a technique to add heat to a magnetic recording medium. Near field light is a type of so-called electromagnetic field to be formed around a substance. Normal light cannot be tapered (narrowed) to a region that is smaller than the wavelength of the light due to a diffraction limitation. However, irradiation of lights with the same wavelength causes the generation of near field light depending upon the microstructure scale, and enables light to be sharply focused on the order of tens of nm on a minimal region. As a specific method to generate the near field light, a method to use metal, referred to as near field light probe generating a near field light from plasmon excited by the light, or a so-called plasmon antenna, is commonly known.

In the plasmon antenna, the near field light is generated by directly irradiating light, but in this technique, a conversion efficiency of the irradiated light to the near field light is low. A majority of the light energy irradiated to the plasmon antenna is reflected by the surface of the plasmon antenna or converted into thermal energy. Since the size of the plasmon antenna is set at or less than the wavelength of the light, the volume of the plasmon antenna is small. Thus, in the plasmon antenna, the temperature rise in association with the heat generation becomes very great.

Such temperature rise causes the plasmon antenna to expand its volume, and to protrude from a medium opposing surface (or an air bearing surface: ABS), which is a surface facing the magnetic recording medium. The end part positioned on the ABS of the MR element is away from the magnetic recording medium, and as a result, there is the problem that a servo signal recorded in the magnetic recording medium cannot be read at the time of recording movement.

Therefore, a technology where no light is directly irradiated to the plasmon antenna is proposed. For example, technology where light that has propagated through a core of waveguide, such as a fiber optic element, is combined with a plasmon generator via a buffer portion in a surface plasmon polariton mode, and the surface plasmon is excited in the plasmon generator, is disclosed in the specification of U.S. Pat. No. 7,330,404. The plasmon generator has an edge of near-field-generator that is positioned on the ABS and that generates a near field light, and a propagation edge facing the waveguide via a buffer portion. The light propagating through the core is totally reflected by the interface between the core and the buffer portion, on which occasion, light that penetrates to the buffer portion, referred to as evanescent light, is generated. This evanescent light and a collective vibration of electrical charge in the plasmon generator are combined, and the surface plasmon is excited to the plasmon generator. The excited surface plasmon propagates to an edge of near-field-generator along the plasmon generator, and generates the near field light at the edge of near-field-generator. According to this technology, since light that propagates through the waveguide does not directly irradiate the plasmon generator, an excessive rise in temperature of the plasmon generator can be prevented.

In an element using a thin film process, such as a magnetic recording element, the core is formed as a slender member having a rectangular cross section. In this case, the waveguide is equipped with a core having a rectangular cross section, and a cladding (hereinafter referred as a clad) surrounding the core, and is occasionally equipped with a member that is referred to as a spot size converter for tapering a laser light. Further, the combination of the waveguide and the plasmon generator is referred to as a near field generator. In a core having the rectangular cross section, it is known that a laser light propagates either in a transverse-electric (TE) mode or a transverse-magnetic (TM) mode. The TE mode is a mode where an electric field component in the core thickness direction becomes 0, and the TM mode is a mode where an electric field component in the core width direction becomes 0. In the TE mode, the electric field component oscillates in the core width direction (the direction indicated with a dashed arrow in FIG. 4A). In the TE mode, the electric field component oscillates in the core thickness direction (the direction indicated with a solid arrow in FIG. 4A).

In order to excite the surface plasmon in the plasmon generator, it is necessary that a laser light exists in the TM mode within the core. In order to excite the surface plasmon, it is desirable that a laser light exists within the waveguide in a specific mode out of the TM mode, and specifically in a mode where only one portion, where the light intensity becomes maximal, exists on the core cross section perpendicular to a propagation direction of the laser light (hereafter, such wave guiding mode is referred to as a fundamental mode) within the waveguide. In the meantime, in order to excite the surface plasmon, it is necessary that the core has a refractive index with a predetermined value or more. However, if the refractive index of the core is increased, a higher order TM mode occurs within the core. Herein, the higher order TM mode means a mode where two or more portions, where the light intensity is maximal, exist on the core cross section (specifically, a mode where two or more portions exist in the x direction or the z direction or both in FIG. 4A), and includes all wave guiding modes except for a fundamental mode. It is also known that the higher order TM mode easily occurs when the core thickness is increased. The higher order TM mode does not only effectively contribute to the excitation of the surface plasmon, but there is also a possibility to inhibit the excitation of the surface plasmon in the fundamental mode.

The objective of the present invention is to provide a waveguide enabling attenuation of a higher order TM mode in a waveguide where a laser light including the higher order TM mode propagates. Further, the objective of the present invention is to provide a thermally-assisted magnetic recording system of magnetic recording element using such a waveguide. In addition, the objective of the present invention is to provide a slider, a head gimbal assembly and a hard disk device using such a magnetic recording element.

SUMMARY OF THE INVENTION

The waveguide of the present invention has a core through which laser light can propagate in a TM mode, that has a rectangular cross section perpendicular to a propagative direction of the laser light, and through which the laser light can propagate in wave guiding modes, a fundamental mode in which only one portion exists on the cross section of the core where a light intensity of the laser light becomes maximal, and a higher order mode in which two or more portions exist where the light intensity becomes maximal, a clad surrounding the core, and a light absorbing element in the clad, the light absorbing element being positioned away from a surface of the core perpendicular to the cross section and perpendicular to the direction in which two or more portions exist where the light intensity becomes maximal, and wherein a distance between the light absorbing element and the core is shorter than a penetration length of evanescent light in the higher order mode, but is longer than a penetration length of evanescent light in the fundamental mode.

The penetration length of evanescent light is determined in each mode, and it is known that the length is short in the fundamental mode, and is long in the higher order mode. The light absorbing element is placed at an offset distance which is shorter than the penetration length of evanescent light in the higher order mode but is longer than that in the fundamental mode. Consequently, light in the fundamental mode passes through the core substantially as is, and light in the higher order mode is absorbed by the light absorbing element and passes through the core after transition to a lower energy. As described above, the light absorbing element, which is a characteristic part of the present invention, functions as a type of filter in the higher order mode, and enables the energy ratio with respect to the fundamental mode to be improved. Furthermore, as described above, the waveguide in this specification is used as a term indicating the structure including the core and the clad surrounding the core.

The magnetic recording element of the present invention has a core through which laser light can propagate in a TM mode, that has a rectangular cross section perpendicular to a propagative direction of the laser light, and through which the laser light can propagate in two wave guiding modes, a fundamental mode in which only one portion exists on the cross section of the core where a light intensity of the laser light becomes maximal, and a higher order mode in which two or more portions exist where the light intensity becomes maximal, a clad surrounding the core, a light absorbing element in the clad, the light absorbing element being perpendicular to the cross section and being positioned away from a surface of the core perpendicular to the direction in which two or more portions exist where the light intensity becomes maximal, and wherein a distance between the light absorbing element and the core is shorter than a penetration length of evanescent light in the higher order mode, but is longer than a penetration length of evanescent light in the fundamental mode, and a plasmon generator extending to an air bearing surface (ABS) and facing a portion of the core. The plasmon generator has one propagative edge extending longitudinally. The propagative edge is equipped with an overlap part overlapped with the core in the longitudinal direction and an edge of near-field-generator positioned in the vicinity of the end of a main magnetic pole layer on the ABS. The overlap part of the propagative edge is combined with the laser light propagating the waveguide in the surface plasmon mode, and the propagative edge allows the surface plasmon to occur in the overlap part to propagate to the edge of near-field-generator.

The above-mentioned and other objectives, characteristics and advantages of the present invention will be clear from the description with reference to attached drawings illustrating the present invention.

DETAILED DESCRIPTION OF THE INVENTION

Figure 1:
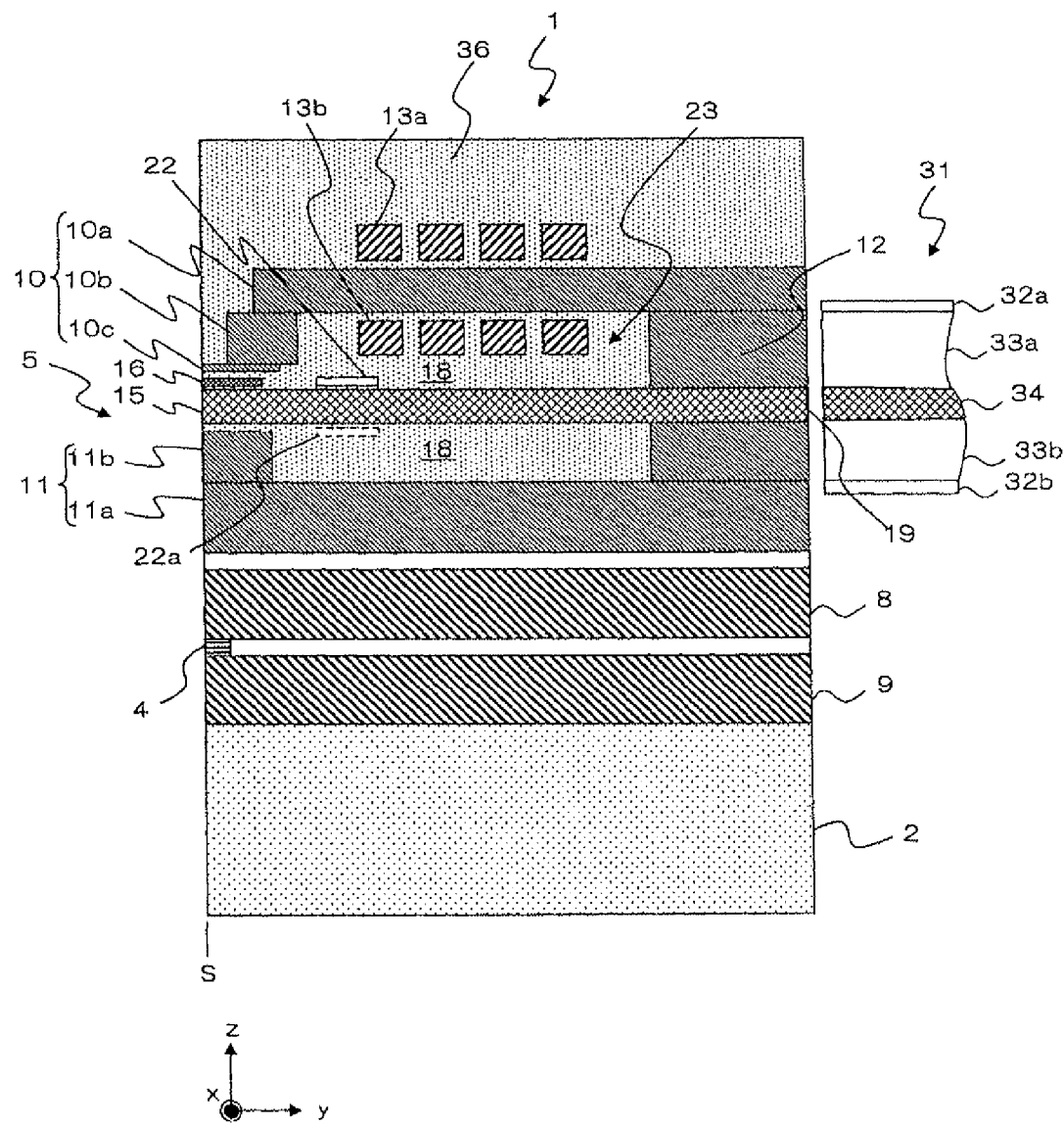
FIG. 1 is a cross sectional view of main parts of the slider including the magnetic recording element of the present invention.

The magnetic recording element of the present invention is described with reference to the drawings. FIG. 1 a cross sectional view of main parts of the slider including the magnetic recording element of the present invention. A slider 1 is configured by laminating an MR element 4 forming a reproductive head part and a magnetic recording element 5 forming a recording head part on a substrate 2 made from ALTIC ($Al_2O_3$—TiC). Furthermore, in the explanation hereafter, "lamination direction" means a film formation direction in a wafer process, and it is matched with the direction z in various diagrams. "Upper side of the lamination direction" means a direction orientating toward an overcoat layer 36 from the substrate 2, and "lower side of the lamination direction" means a direction orientating toward the substrate 2 from the overcoat layer 36.

The slider 1 has the reproductive head part equipped with the MR element 4 positioned by exposing its tip portion to an air bearing surface S, an upper side shield layer 8 and a lower side shield layer 9 placed so as to interpose the MR element 4 from upper and lower sides in the lamination direction. Any configuration using a magnetic resistance effect, such as a current-in-plane (CIP)—gigantic-magneto-resistive (GMR) element where a sensing current flows in the direction in parallel to the film surface, a current-perpendicular-to-plane (CPP)—gigantic-magneto-resistive (GMR) element where a sensing current flows in the direction vertical to the film surface (lamination direction) or tunneling-magneto-resistive (TMR) element utilizing a tunnel effect, can be applied to the MR element 4. When the CPP-GMR element and the TMR element are applied, the upper side shield layer 8 and the lower side shield layer 9 are also utilized as electrodes to supply a sensing current.

The slider 1 is equipped with the magnetic recording element 5 for so-called vertical magnetic recording that forms the recording head part. The magnetic recording element 5 has a main magnetic pole layer 10 for recording. The main magnetic pole layer 10 has a first body part 10a, a second body part 10b and a magnetic pole end part 10c, all of which are made of an alloy of any two or three of Ni, Fe and Co. A return shield layer 11 is placed in the lower side of the main magnetic pole layer 10 in the lamination direction. The return shield layer 11 has a first body part 11a and a second body part 11b, and both of which are also made of an alloy of any two or three of Ni, Fe and Co. The main magnetic pole layer 10 and the return shield layer 11 are magnetically linked with each other via a contact part 12. In the present embodiment, the return shield layer 11 is placed in the lower side of the main magnetic pole layer 10 in the lamination direction, but it can be placed in the upper side of the main magnetic pole layer 10 in the lamination direction. The overcoat layer 36 made of $Al_2O_3$ is placed in the upper side of the main magnetic pole layer 10 in the lamination direction.

Coils 13a and 13b are wound around the main magnetic pole layer 10 centering on the contact part 12. A magnetic flux is generated to the main magnetic pole layer 10 by a current applied to the coils 13a and 13b from the outside. The coils 13a and 13b are formed from an electrically conductive material, such as Cu. Two layers of the coils 13a and 13b are established in the present embodiment, but one layer or three layers or more are also acceptable. Further, the number of windings is four in the present embodiment, but it shall not be limited to this, as well.

Figure 2:
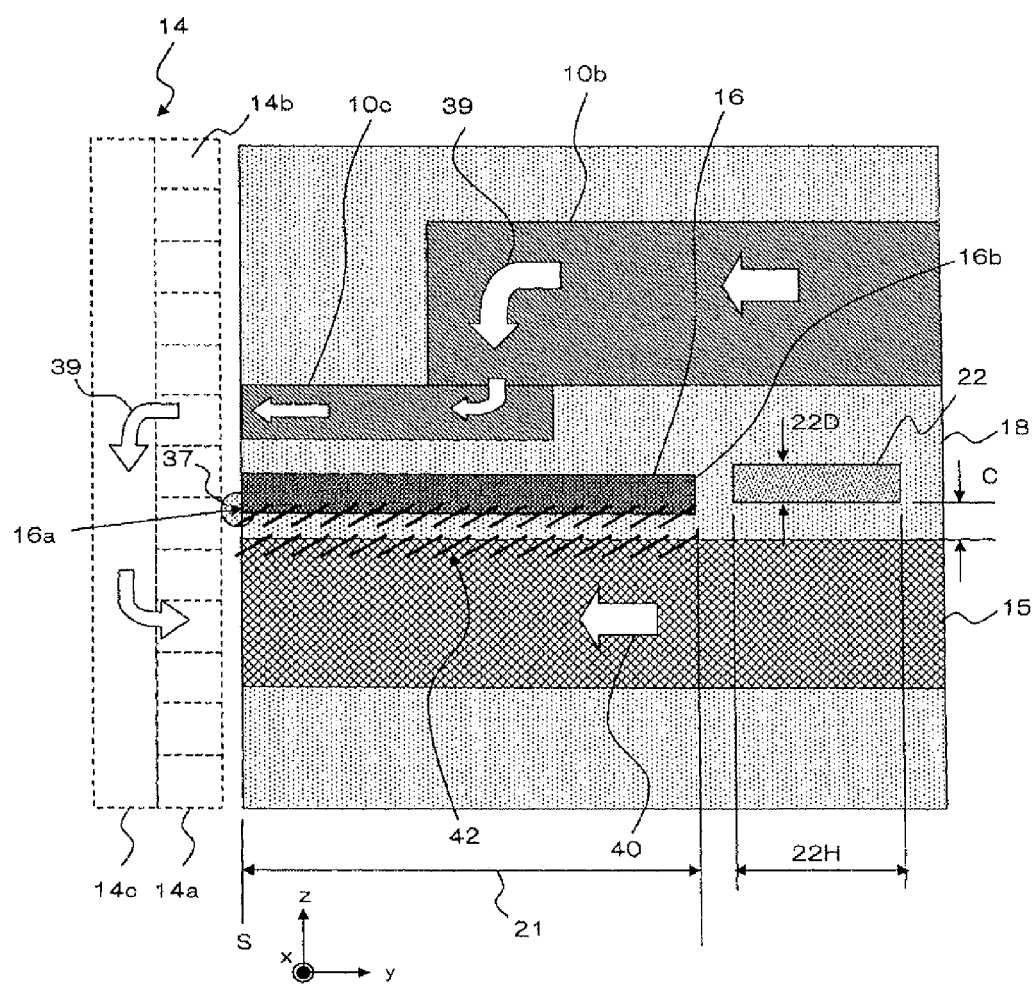
FIG. 2 is an enlarged view of the vicinity of the magnetic recording element of the slider shown in FIG. 1.

The main magnetic pole layer 10 is tapered to a magnetic pole tip part 10c in the vicinity of the air bearing surface S not only in the direction perpendicular to the film surface (z direction) but also in the track width direction (x direction). With reference to FIG. 2, the magnetic flux 39 generated within the main magnetic pole layer 10 is tapered toward the air bearing surface S, and is discharged as a minute and strong magnetic flux 39 for writing corresponding to the high recording density toward a magnetic recording medium 14 and from the magnetic pole tip part 10c positioned on the air bearing surface S. The magnetic recording medium 14 has a configuration for vertical magnetic recording. The surface layer of the magnetic recording medium 14 is a recording layer 14a, and the magnetic flux 39 discharged from the magnetic pole tip part 10c travels in the recording layer 14a in the vertical direction (y direction), and magnetizes each recording bit 14b of the recording layer 14a in the vertical direction. The magnetic flux 39 passes through the recording layer 14a, and then its flux path changes to the in-plane direction (z direction) of the magnetic recording medium 14 at a backing layer 14c made from a soft magnetic body underneath, and further changes the direction to the vertical direction (y direction) again in the vicinity of the return shield layer 11 before being absorbed by the return shield layer 11. In other words, the return shield layer 11 plays a role to control the magnetic flux so as to have the magnetic flux vertically pass through the recording layer 14a and create the U-shaped magnetic flux path.

Further, the second body part 11b of the return shield layer 11 forms a trailing shield part whose layer cross section is wider in the track width direction (x direction) than the first body part 11a. A placement of such a return shield layer 11 causes a steep gradient in the magnetic field between the return shield layer 11 and the main magnetic pole layer 10. As a result, signal output jitter becomes small and an error rate at the time of reading can be small.

Figure 3A:
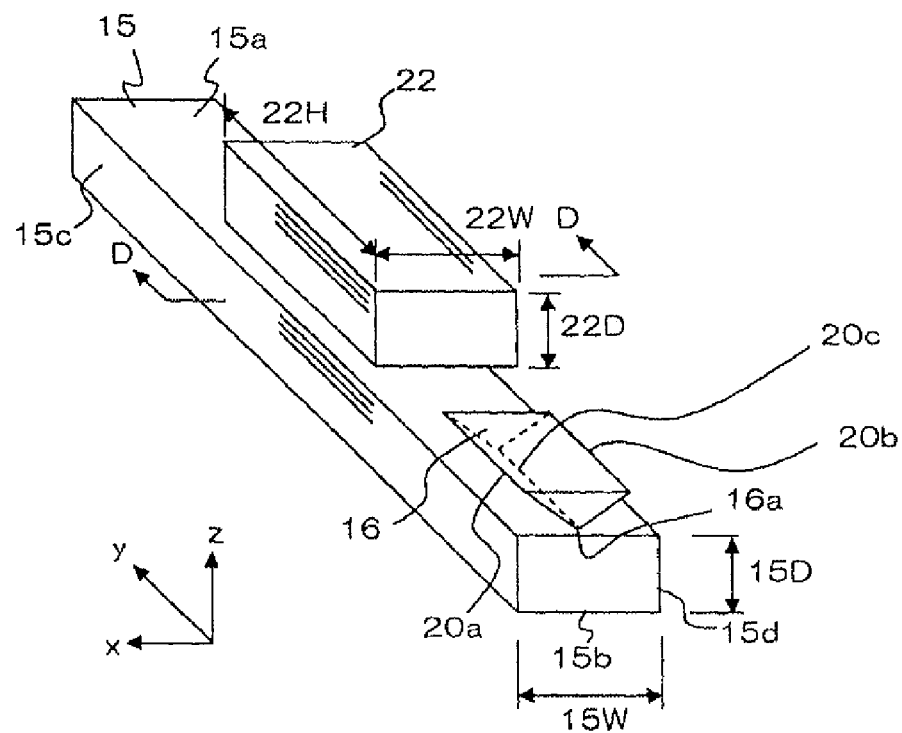
FIGS. 3A-3B are perspective views illustrated with the extraction of the core, the plasmon generator and the light absorbing element.
Figure 3B:
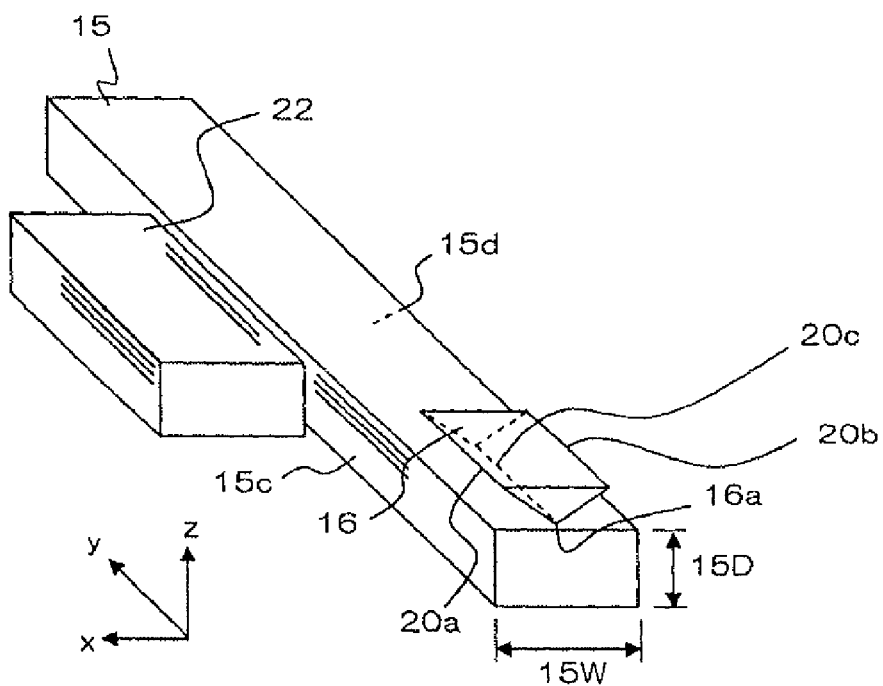

With reference to FIG. 1, a rectangular core 15 and a plasmon generator 16 are established between the main magnetic pole layer 10 and the return shield layer 11. FIGS. 3A-3B are perspective views of the vicinity of the magnetic recording element where an illustration of the main magnetic pole layer is omitted. In the core 15, the cross section perpendicular to the propagation direction of the laser light is rectangular, and the width 15W is greater than the thickness 15D. The core 15 enables the transmission of light in the TM mode including the fundamental mode and the higher order mode. Furthermore, in this specification, "width" means the dimension in the x direction, "thickness" means the dimension in the z direction and "height" means the dimension in the y direction. With reference to FIG. 1, a clad 18 is established around the core 15 so as to surround the core 15. The core 15 and the clad 18 constitute a waveguide 23. The core 15 has a higher refractive index than the clad 18, and propagates laser light 40 toward the air bearing surface S while the laser light 40 input from a light source 31 to be described later is totally reflected by the interface between the core 15 and the clad (or cladding) 18. The core 15 extends to a rear surface 19 of the slider 1 for the connection with a light source 31. In the present embodiment, the core 15 extends to the air bearing surface S and penetrates through the slider 1, but the end of the core 15 can be terminated halfway at the side of the air bearing surface S. Although the illustration is omitted, the clad 18 is placed between the core 15 and the contact part 12.

When the wavelength of the laser light 40 is 600 nm, the clad 18 can be formed, for example, of $SiO_2$ and the core 15 can be formed, for example, of $Al_2O_3$. When the wavelength of the laser light is 800 nm, the clad 18 can be formed, for example, of $Al_2O_3$ and the core 15 can be formed, for example, of TaOx. TaOx means titanium oxide with any composition herein, with its typical compositions being $Ta_2O_5$, TaO, $TaO_2$ and or the like, but is not limited to these typical ones.

Figure 4A:
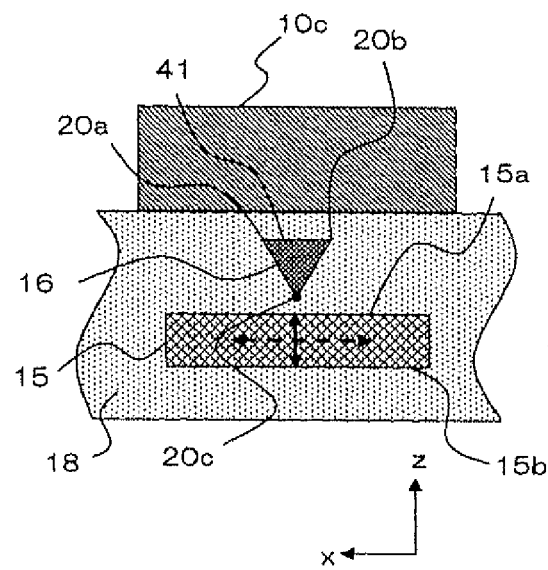
FIGS. 4A-4D are cross sectional views showing various modes of the plasmon generator, respectively.

The plasmon generator 16 is positioned away from the substrate 2 and extends to the air bearing surface S while facing a portion of the core 15. The plasmon generator 16 is formed of Au, Ag, Cu, Al, Pd, Ru, Pt, Rh, Ir or of an alloy consisting primarily of these metals. The plasmon generator 16 is a metallic piece having a mostly-triangular prism shape with a triangular cross section. Three apexes of the plasmon generator 16 on the triangular cross section form three edges 20a, 20b and 20c extending toward the longitudinal direction (y direction) of the plasmon generator 16. Thus, the plasmon generator 16 is formed so as to have one apex on the triangular cross section facing the core 15, and this one apex forms the propagative edge 20c facing the core 15. With reference to FIG. 4A, one side 41 not facing the core 15 is substantially in parallel to the lamination direction upper surface 15a of the core 15. In the explanation hereafter, the triangular cross section shown in FIGS. 3A-3B and 4A may be referred to as an inverted triangular cross section.

The plasmon generator 16 extends substantially in parallel to the core 15 and in the direction vertical to the air bearing surface S. The plasmon generator 16 does not extend to the rear surface 19 of the slider 1. The propagative edge 20c has an overlap part 21 that overlaps with the core 15 in the longitudinal direction (y direction) of the plasmon generator 16. The overlap part 21 generates surface plasmon 42 by coupling the core 15 with the propagating laser light 40 in a surface plasmon mode. An edge of near-field-generator 16a is formed at the end part of the plasmon generator 16 at the side of the air bearing surface S. The edge of near-field-generator 16a is positioned in the vicinity of the magnetic pole tip part 10c on the air bearing surface S. The propagative edge 20c propagates the surface plasmon 42 generated in the overlap part 21 to the edge of near-field-generator 16a along the propagative edge 20c. Near field light 37 is generated from the edge of near-field-generator 16a, and as described above, heat is applied at the same time of the magnetic field to a portion where information is recorded out of the magnetic recording medium 14. This causes a rise of the temperature in the portion where information is recorded and reduction of coercive force, and information is recorded.

In general, the laser light propagates within the rectangular core 15 in the TE mode or the TM mode depending upon incident conditions. Herein, the TE mode is a mode where the electric field component in the core thickness direction becomes 0, and the TM mode is a mode where the electric field component in the core width direction becomes 0. The electric field oscillates in the track width direction (the direction indicated with a dashed arrow (x direction) in FIG. 4A) in the TE mode, and the electric field component oscillates in the core thickness direction (the direction indicated with a solid arrow (z direction) in FIG. 4A) in the TM mode. In order to excite the surface plasmon in the plasmon generator, it is necessary that a laser light exists within the core in the TM mode.

Figure 5A:
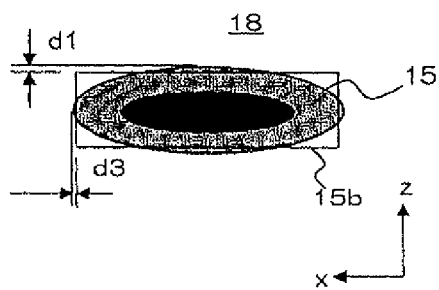
FIGS. 5A-5D are conceptual diagrams showing light intensity distribution of a laser light in the fundamental mode and some higher order modes, respectively.
Figure 5B:
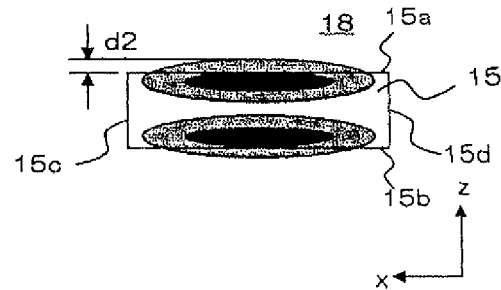

The TM mode normally includes a fundamental mode where only one portion, where the light intensity becomes maximal, exists on the cross section of the core 15, and a higher order mode where two or more portions, where the light intensity becomes maximal, exist on the cross section of the core 15. FIG. 5A is a cross sectional view of the core showing the light intensity distribution of the laser light in the fundamental mode. FIG. 5B shows an example of the higher order mode where two maximal values for the light intensity appear in the thickness direction (z direction) of the core 15. Herein, "cross section" is a cross section perpendicular to the propagative direction y of the laser light, and specifically, a cross section extracted along the D-D line of FIG. 3A. In these diagrams, the black portion represents a portion where the light intensity is strong, and the gray portion represents a portion where the light intensity is weak, and the white portion represents a portion where the light intensity is hardly detected. Similarly, illustration is omitted, but a mode where the maximal value for the intensity can be three or greater in the thickness direction (z direction) of the core 15 can also exist.

The light in the TM mode that propagates through the core is not completely trapped within the core, but exists in a form where a portion penetrates to the outside of the core. This light is referred to as evanescent light. FIGS. 5A and 5B show situations where a portion of the laser light that propagates through the core 15 penetrates to the outside of the core 15 as the evanescent light. The penetration length of the evanescent light is short in the fundamental mode (length d1), and is long in the higher order mode (length d2). The penetration length of the evanescent light is measured vertically from the core 15, and defined as a distance including 99% of light energy in the evanescent light.

In order to generate surface plasmon polariton, it is desirable to use the fundamental mode. The higher order mode does not only efficiently contribute to the generation of the surface plasmon polariton, but also inhibits the generation of the surface plasmon polariton in the fundamental mode. Consequently, efficient absorption of lights in only the higher order mode by utilizing a difference in the penetration length of the evanescent light enables the energy ratio in the fundamental mode to be improved and efficient generation of the surface plasmon polariton.

In the present embodiment, a light absorbing element 22 is established in the clad 18 along a surface 15a of the core 15 perpendicular to the cross section of the core 15 and perpendicular to the direction z where two or more portions, where the light intensity becomes maximal, exist. The distance C (see FIG. 2) between the light absorbing element 22 and the core 15 is designed to be shorter than the penetration length of the evanescent light in the thickness direction (z direction) of the core 15 in any higher order modes where two or more maximal values for the light intensity appear in the thickness direction (z direction) of the core 15, and to be longer than the penetration length d1 of the evanescent light in the thickness direction (z direction) of the core 15 in the fundamental mode. Consequently, the light absorbing element 22 hardly absorbs any light in the fundamental mode, but absorbs a light in the higher order mode.

The placement position of the light absorbing element 22 depends upon an assumed higher order mode. In the present embodiment, a mode where two or more portions, where the light intensity becomes maximal, exist in the thickness direction (z direction) of the core (for example, see FIG. 5B) is assumed. In such a higher order mode, the evanescent light easily penetrates from the surfaces 15a and 15b. In such case, as shown in FIG. 3A, it is preferable to place the light absorbing element 22 on the surface perpendicular to the thickness direction (z direction) of the core 15. Thus, it is preferable that the light absorbing element 22 is placed on the surface 15a of the core 15 at the side where the plasmon generator 16 is positioned. With this design, since the evanescent light penetrating from the surface 15a at the side of the plasmon generator 16 is effectively absorbed, the light energy is effectively supplied to the plasmon generator 16.

Figure 5C:
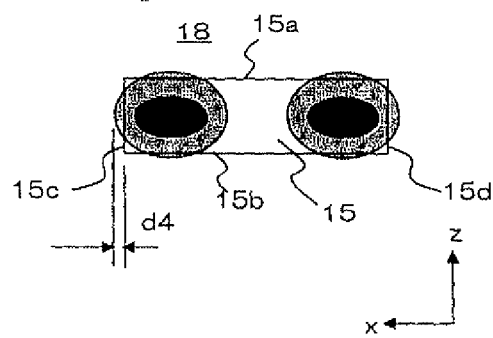

In the meantime, there is also a case where two or more portions exist in the width direction (x direction) of the core where the light intensity becomes maximal. FIG. 5C is an example where two maximal values for the light intensity appear in the width direction (x direction) of the core 15. Even in this case, the penetration length of the evanescent light is designed to be shorter (length d3) in the fundamental mode, and to be longer (length d4) in the higher order mode. In general, when the fundamental mode and the higher order mode co-exist within the core, a laser light does not linearly propagate due to a difference of propagative rates of both modes, but propagates by tracking a snaking route (or winding route). Thus, evanescent light that does not contribute to the plasmon generation because of not being coupled with plasmon may penetrate from the surface 15a of the core 15 at the plasmon generator side. Therefore, it is desirable to absorb the higher order mode where two or more portions exist in the width direction (x direction) of the core where the light intensity becomes maximal as well. Then, as shown in FIG. 3B, it is preferable to place the light absorbing element 22 on the surface 15c of the core. Alternatively, although not shown in the figures, the light absorbing element 22 may be placed on the surface 15d of the core. The distance between the light absorbing element 22 and the core 15 is designed to be shorter than the penetration length of the evanescent light in the width direction (x direction) of the core 15 in any higher order modes where two or more maximal values for the light intensity appear in the width direction (x direction) of the core 15, and to be longer than the penetration length d3 of the evanescent light in the width direction (x direction) of the core 15 in the fundamental mode. Placement of the light absorbing element 22 at such a position enables efficient absorption of a light in the higher order mode where two or more maximal values for the light intensity appear in the width direction (x direction) of the core 15.

Figure 6:
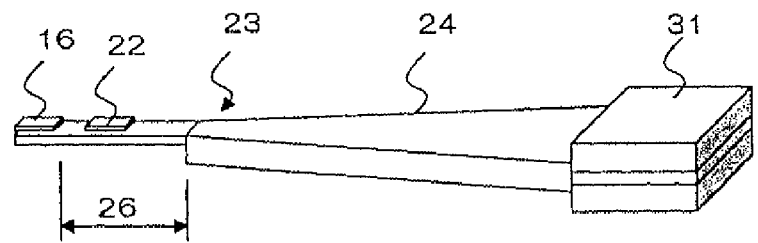
FIG. 6 is a conceptual diagram of the waveguide having a spot size converter.

The light absorbing element 22 extends along the longitudinal direction (y direction) of the core 15. The placement position of the light absorbing element 22 is not greatly restricted, but it is desirable to extend along a portion of the core 15 where its cross section perpendicular to the longitudinal direction of the core 15 is uniform. For example, as shown in FIG. 6, when the spot size converter 24 is placed in the waveguide in order to taper the cross section of the core 15, it is preferable to place the light absorbing element 22 not at the position of the spot size converter 24 where the core cross section changes, but along the portion 26 at the side of the ABS where the core cross section is constant in the longitudinal direction.

A material of the light absorbing element 22 is not particularly limited as long as it can efficiently absorb the evanescent light, but as described later, it is preferable that the extinction coefficient is three or greater. One of the preferable materials of the light absorbing element 22 is cobalt iron (CoFe). Further, it is desirable that the width 22W of the light absorbing element 22 is greater than the width 15W of the core.

The light absorbing element(s) 22 can be placed at positions of both sides interposing the core 15 in the clad 18. In FIG. 1, a second light absorbing element 22a positioned at the opposite side of the light absorbing element 22 interposing the core is indicated with a dashed line. The second light absorbing element 22a, as similar to the light absorbing element 22, is positioned away from the core 15 in the thickness direction of the core 15. It is desirable that the distance between the second light absorbing element 22a and the core 15, as similar to the light absorbing element 22, is shorter than the penetration length of the evanescent light in any higher order modes, but longer than the penetration length of the evanescent light in the fundamental mode. Further, the number of the light absorbing elements 22 is not particularly limited, but a plurality of light absorbing elements can be placed along one surface or both surfaces of the core 15, respectively. Even when the light absorbing elements 22 are placed on the surfaces perpendicular to the width direction (x direction) of the core, they can be placed on both surfaces 15c and 15d.

Figure 5D:
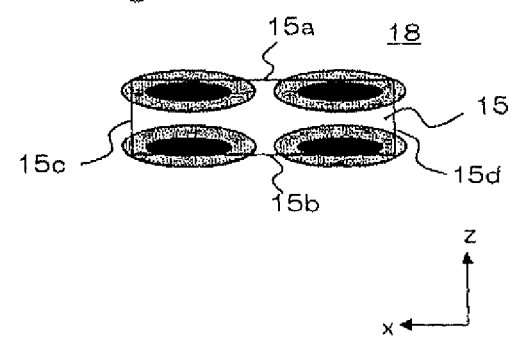

In addition, there can also be a case where two or more portions exist both in the width direction (x direction) and the thickness direction (z direction) of the core where the light intensity becomes maximal. FIG. 5D is an example of a higher order mode where two maximal values for the light intensity appear in the width direction (x direction) and the thickness direction (z direction) of the core 15. When such a higher order mode exists, the light absorbing elements 22 can be placed in at least either the surface 15c or 15d of the core and at least either the surface 15a or 15b of the core 15. Alternatively, the light absorbing element 22 can be placed only on the surface 15a.

The light source 31 is linked to the rear surface 19 of the slider 1. The light source 31 is a laser diode, and has a pair of electrodes 32a and 32b, positive (P) type and negative (N) type dads 33a and 33b interposed by these electrodes, and an active layer 34 positioned between both the dads 33a and 33b, and a cleavage surface that has a reflecting mirror structure. The light source 31 is secured to the slider 1 using an appropriate method. The active layer 34 where the laser light continuously oscillates is arranged on the same line of the core 15 of the slider 1, and the laser light 40 generated in the active layer 34 is designed to enter into the core 15. The wavelength of the laser light 40 is not particularly limited, but laser light having a wavelength of approximately 800 nm is preferably used.

Figure 4B:
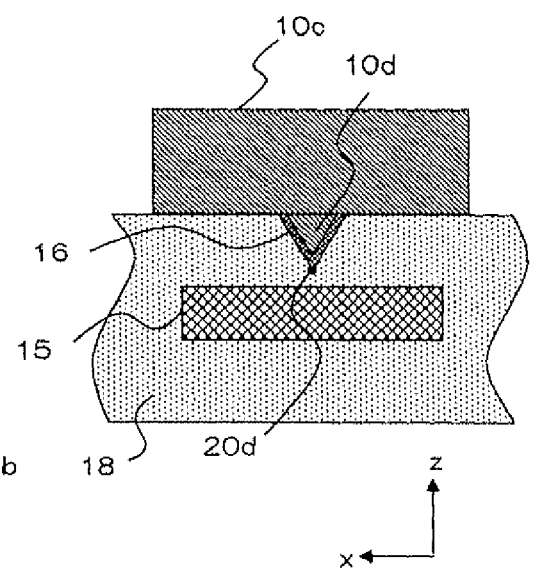

FIG. 4B is a similar diagram to FIG. 4A showing another embodiment of the plasmon generator. The plasmon generator 16 in the present embodiment has a V-shaped cross section whose apex faces the core 15, and the propagative edge 20d is formed along the V-shaped apex. The plasmon generator 16 is formed by laminating Au, Ag, Cu, Al, Pd, Ru, Pt, Rh, Ir or an alloy consisting primarily of these metals on the protrusion 10d with the triangular cross section of the main magnetic pole layer 10 jutting from the side of the substrate 2. The plasmon coupling occurs at the propagative edge 20d, and the edge of near-field-generator is formed at the end part of the propagative edge 20d at the side of the ABS.

Figure 4C:
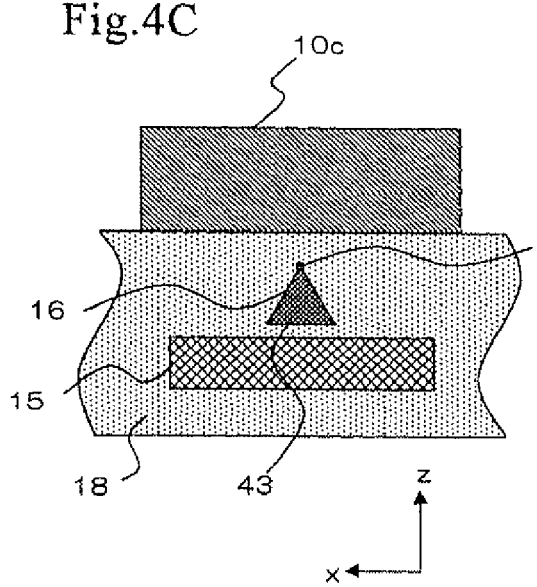

FIG. 4C shows another embodiment of the plasmon generator similarly to FIG. 4A. The plasmon generator 16 of the present embodiment has a triangular cross section where one edge 43 faces the core 15, and has a triangular prism of external form as a whole. The material of the plasmon generator 16 is the same as that in the embodiment shown in FIG. 4A. The plasmon coupling occurs at a propagative edge 20e formed along the apex away from the core 15. In other words, the plasmon coupling occurs at the propagative edge 20e facing the main magnetic pole 10, and the edge of near-field-generator is formed at the end of the propagative edge 20e at the side of the ABS. The clad 18 exists between the plasmon generator 16 and the core 15, and the plasmon generator 16 may make direct contact with the core 15.

Figure 4D:
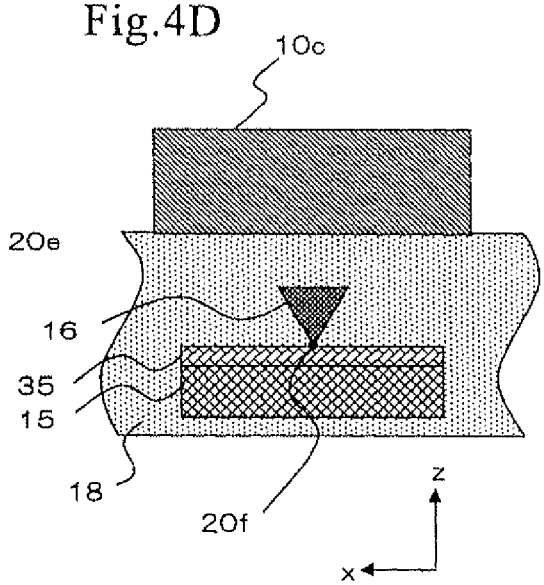

FIG. 4D shows another embodiment of the plasmon generator similarly to FIG. 4A. The configuration and the material of the plasmon generator 16 are the same as those in the embodiment shown in FIG. 4A. In the present embodiment, a buffer part 35 is placed between the plasmon generator 16 and the core 15. The buffer part 35 has a refractive index smaller than that of the core 15, and is separately placed from the clad 18. The buffer part 35 couples the laser light propagating through the core 15 with the plasmon generator 16 in the surface plasmon mode. In the present embodiment, the plasmon coupling occurs at a propagative edge 20f opposing the core 15, and the edge of near-field-generator is formed at the end of the propagative edge 20f at the side of the ABS.

Figure 7:
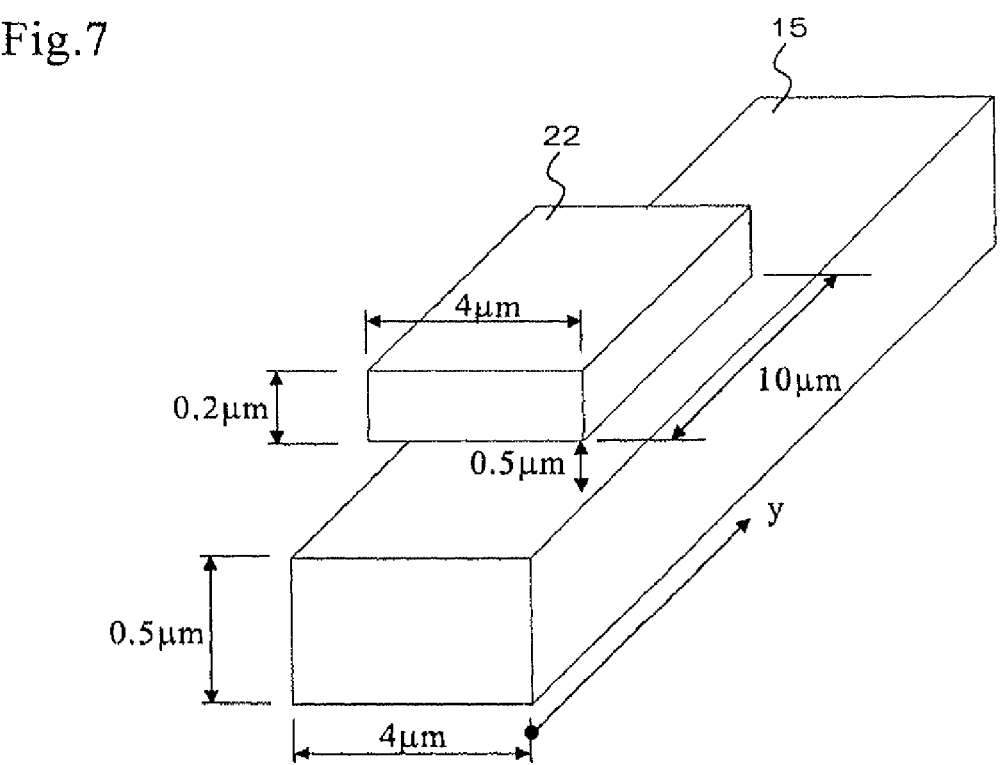
FIG. 7 shows primary dimensions of the light absorbing element and the core in one embodiment.

Next, in order to check the effect of the light absorbing element 22, numerical models of the core 15, the clad 18 and the light absorbing element 22 were prepared, and transmission efficiencies in a fundamental mode and a higher order mode (in the description of the specification hereafter, the higher order mode means a mode where there are two portions, where the light intensity becomes maximal, except for a specially noted case) were obtained according to calculations. A material of the core 15 was TaOx (refractive index n=2.15), a material of the clad 18 was $Al_2O_3$ (refractive index n=1.65) and a material of the light absorbing element 22 was cobalt iron (CoFe) (refractive index n=2.15, extinction coefficient i=4.24). Dimensions of the light absorbing element 22 and the core 15 and distance between the light absorbing element 22 and the core 15 were as shown in FIG. 7. A TM-biased laser light with 824 nm of wavelength entered from a position where y=0 in the diagram, and the transmission efficiencies in the fundamental mode and the higher order mode at some points were obtained. Furthermore, the penetration length of the evanescent light in the fundamental mode is 0.25 μm, and that in the higher order mode is 1.2 μm.

Figure 8:
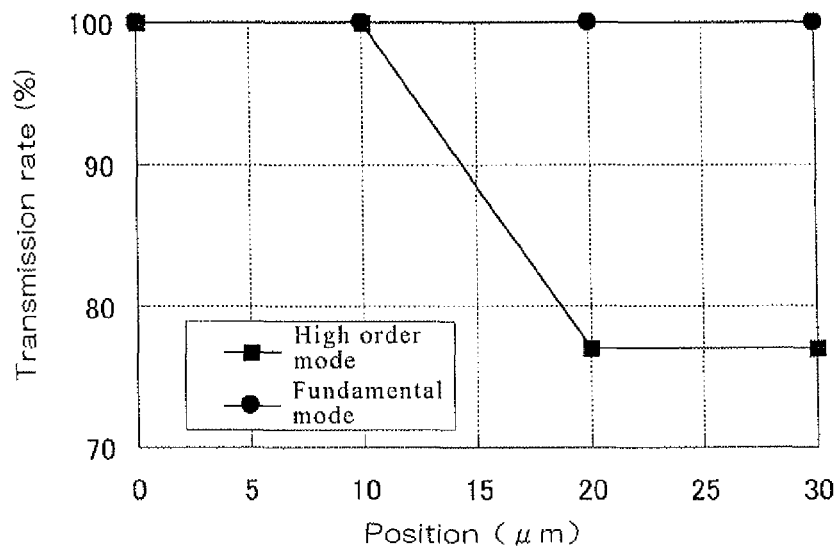
FIG. 8 is a graph showing light absorption performance of the light absorbing element in the fundamental mode and the higher order mode.

As shown in FIG. 8, since the laser light is not absorbed by the light absorbing element 22 within the range where y is from 0 μm to 10 μm, the transmission efficiencies in any mode were 100%. The transmission efficiency in the higher order mode was linearly decreased along with the increase in y within the range where y was from 10 μm to 20 μm, i.e., within the range where the light absorbing element 22 and the core 15 were overlapped along the y-direction in which the core 15 extends. Since the laser light is not absorbed by the light absorbing element 22 within the range where y exceeds 20 the transmission efficiency in the higher order mode maintained a constant value again. In the meantime, since the laser light in the fundamental mode is not absorbed by the light absorbing element 22, 100% of transmission efficiency was maintained. This is because the distance (0.5 μm) between the light absorbing element 22 and the core 15 was set to be longer than the penetration length of the evanescent light in the fundamental mode (0.25 μm), but was set to be shorter than the penetration length in the higher order mode (1.2 μm), and only the laser light in the higher order mode was efficiently absorbed.

Figure 9:
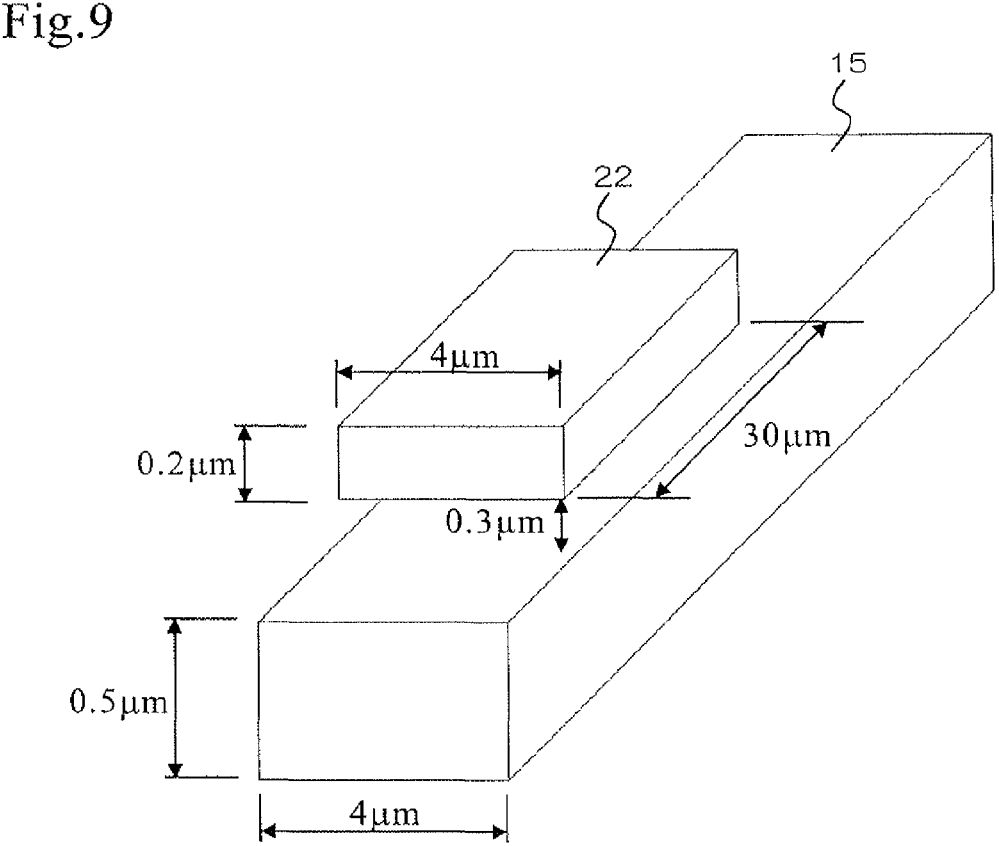
FIG. 9 shows primary dimensions of the light absorbing element and the core in one embodiment.

Next, the dimensions of the light absorbing element 22 and the core 15 and the distance between the light absorbing element 22 and the core 15 were changed, and preferable numerical ranges of these were examined. The materials of the core 15, the clad 18 and the light absorbing element 22 and the wavelength and polarization direction of the laser light were the same as the examined above, and the dimensions of the light absorbing element 22 and the core 15 and the distance between the light absorbing element 22 and the core 15 were the same as those in the fundamental model shown in FIG. 9. In the examination hereafter, the distance between the light absorbing element 22 and the core 15, the width, thickness and height of the light absorbing element 22, and the extinction coefficient of the light absorbing element 22 were changed.

Figure 10:
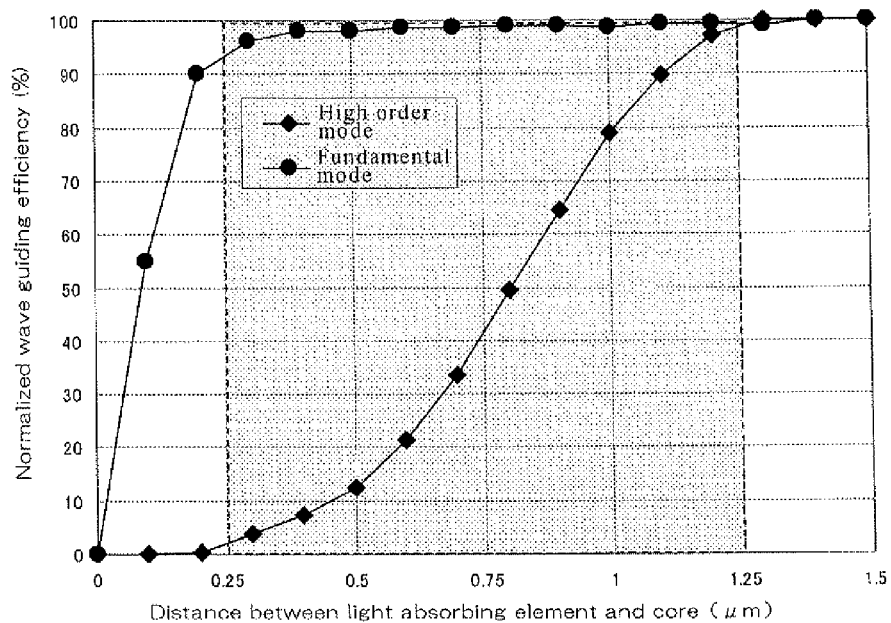
FIG. 10 is a graph showing a relationship between the distance between the light absorbing element and the core, and the wave guiding efficiency.

First, as shown in FIG. 10, the distance between the light absorbing element 22 and the core 15 was changed between 0 μm to 1.5 μm. As described above, since the penetration length of the evanescent light in the fundamental mode is 0.25 μm, when the distance between the light absorbing element 22 and the core 15 is smaller than this, even the laser light in the fundamental mode is also absorbed. However, when the distance between the light absorbing element 22 and the core 15 is 0.25 μm or longer, the reduction of the wave guiding efficiency is hardly observed. In the meantime, in the higher order mode, the wave guiding efficiency is overall lower than that in the fundamental mode up to 1.2 μm, which is the penetration length of the evanescent light, and when the distance between the light absorbing element 22 and the core 15 reaches 1.2 μm, the wave guiding efficiency becomes substantially the same as that in the fundamental mode. Therefore, considering the fundamental mode and the higher order mode, the ranges of 0.25 μm or greater and 1.2 μm or less are preferable for the distance between the light absorbing element 22 and the core 15. Considering the higher order mode where there are three or more portions, where the light intensity becomes maximal, since it is believed that the gradient of the curve in the higher order mode in FIG. 10 becomes gradual (the curve becomes flattened), the preferable range of the distance between the light absorbing element 22 and the core 15 tends to expand. Therefore, even when a further higher order mode is considered, the range of 0.25 μm or greater and 1.2 μm or less is a desirable range for the distance between the light absorbing element 22 and the core 15.

Figure 11:
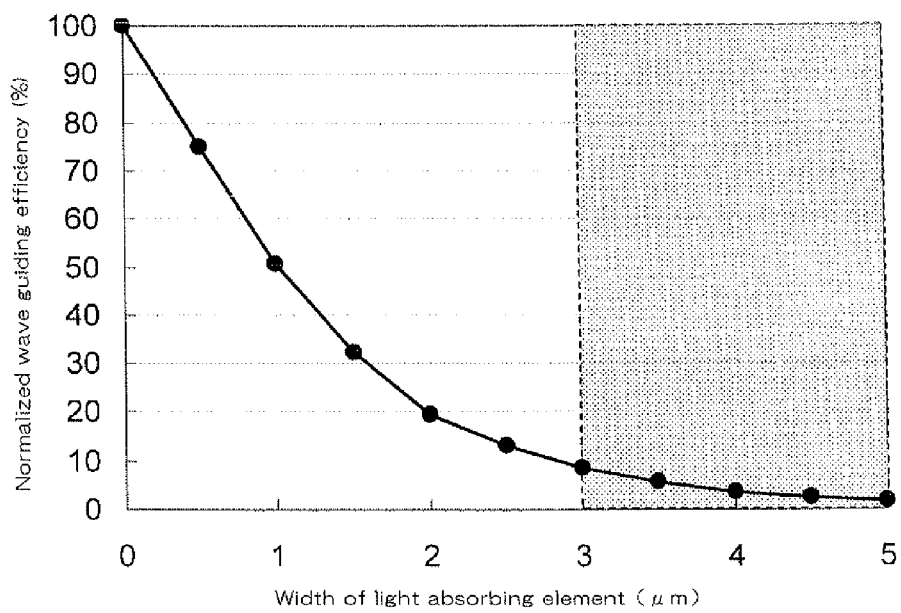
FIG. 11 is a graph showing a relationship between width of the light absorbing element and a wave guiding efficiency.

Next, as shown in FIG. 11, the width of the light absorbing element 22 was changed between 0 μm and 5 μm, and the wave guiding efficiency in the higher order mode was obtained. As the width of the light absorbing element 22 is increased, it is obvious that the wave guiding efficiency is drastically decreased and the laser light in the higher order mode is absorbed. Substantially about 10% is transmitted in the vicinity of 3 μm of width, which is slightly narrower than that of the core. For reliable manufacturing, it is desirable that the width of the light absorbing element 22 is equal to that of the core 15 or wider.

Figure 12:
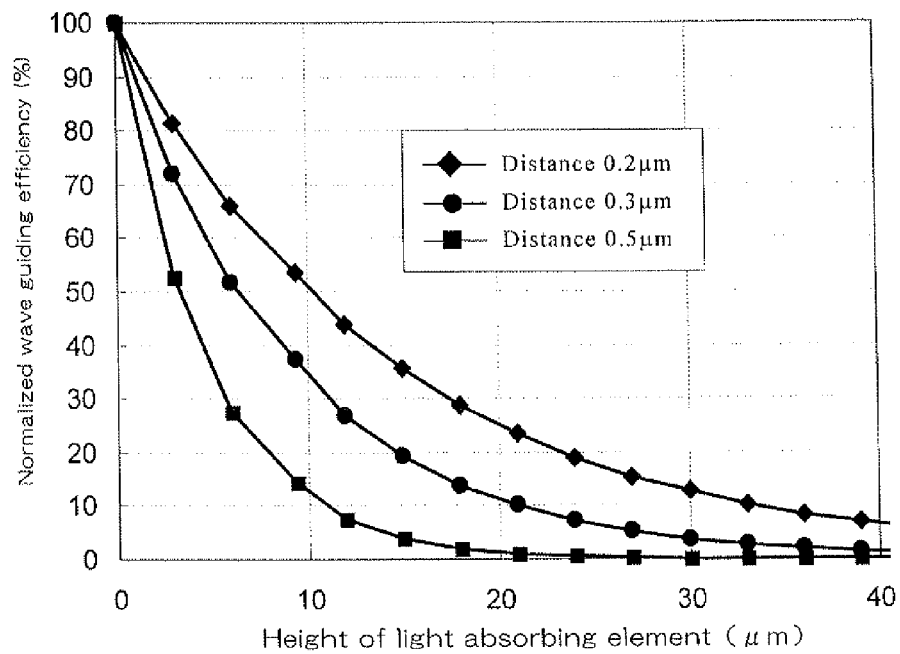
FIG. 12 is a graph showing a relationship between height of the light absorbing element and a wave guiding efficiency.

Next, as shown in FIG. 12, the height of the light absorbing element 22 was changed between 0 μm and 40 μm, and the wave guiding efficiency in the higher order mode was obtained. The distance between the light absorbing element 22 and the core 15 was changed in three ways: 0.2 μm, 0.3 μm and 0.5 μm. When the height is large, the wave guiding efficiency is decreased because light in the higher order mode becomes easily absorbed. When the distance between the light absorbing element 22 and the core 15 is small, the wave guiding efficiency is easily decreased because an absorption efficiency of the light becomes higher even if the height is small. When the distance between the light absorbing element 22 and the core 15 is large, it becomes necessary to increase the height because the absorption efficiency of the light decreases.

Figure 13:
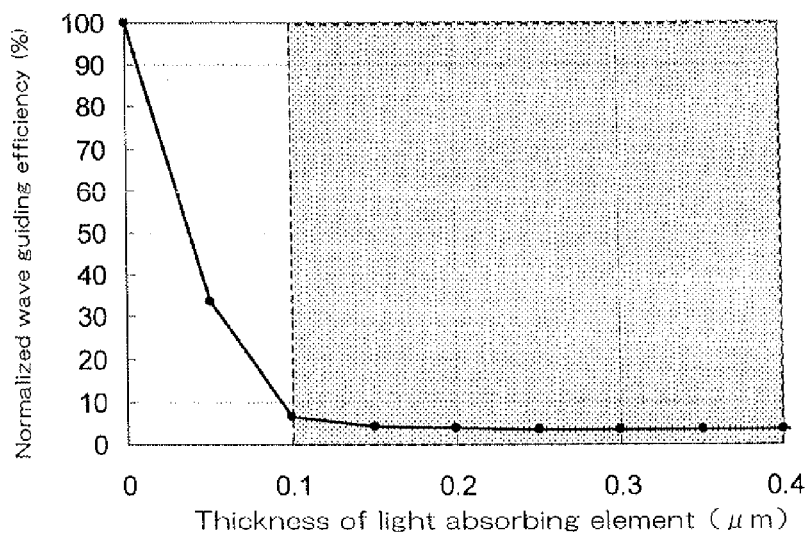
FIG. 13 is a graph showing a relationship between thickness of the light absorbing element and a wave guiding efficiency.

Next, as shown in FIG. 13, the thickness of the light absorbing element 22 was changed between 0 μm to 0.4 μm, and the wave guiding efficiency in the higher order mode was obtained. Even when the thickness of the light absorbing element 22 is approximately 0.1 μm, a sufficient absorption effect is demonstrated and 0.1 μm or greater of thickness is sufficient.

Figure 14:
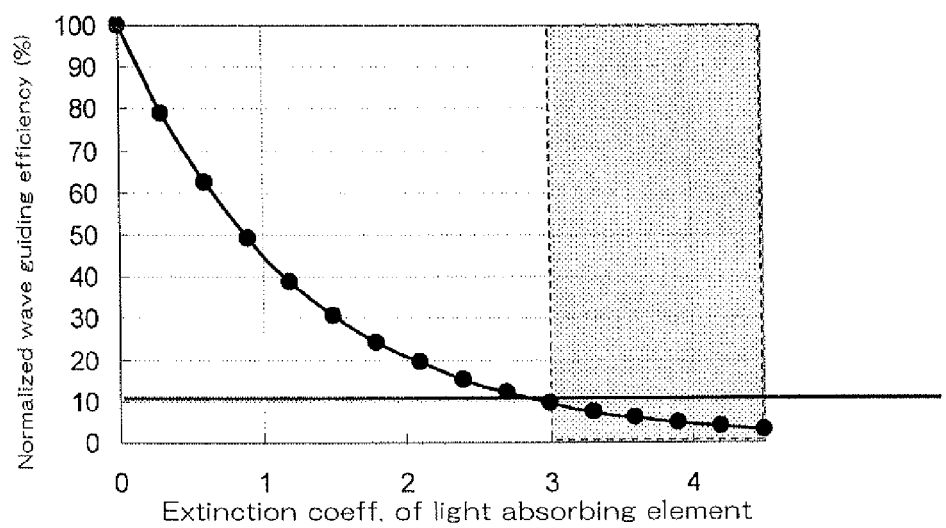
FIG. 14 is a graph showing a relationship between an extinction coefficient of the light absorbing element and a wave guiding efficiency.

Next, as shown in FIG. 14, the extinction coefficient of the light absorbing element 22 was changed between 0 and 4.5, and the wave guiding efficiency in the higher order mode was obtained. In association with the increase in the extinction coefficient, the wave guiding efficiency is decreased. Since it is believed that a sufficient absorption effect can be obtained if the wave guiding efficiency is decreased to approximately 10%, it is preferable that the extinction coefficient is 3 or greater.

Figure 15:
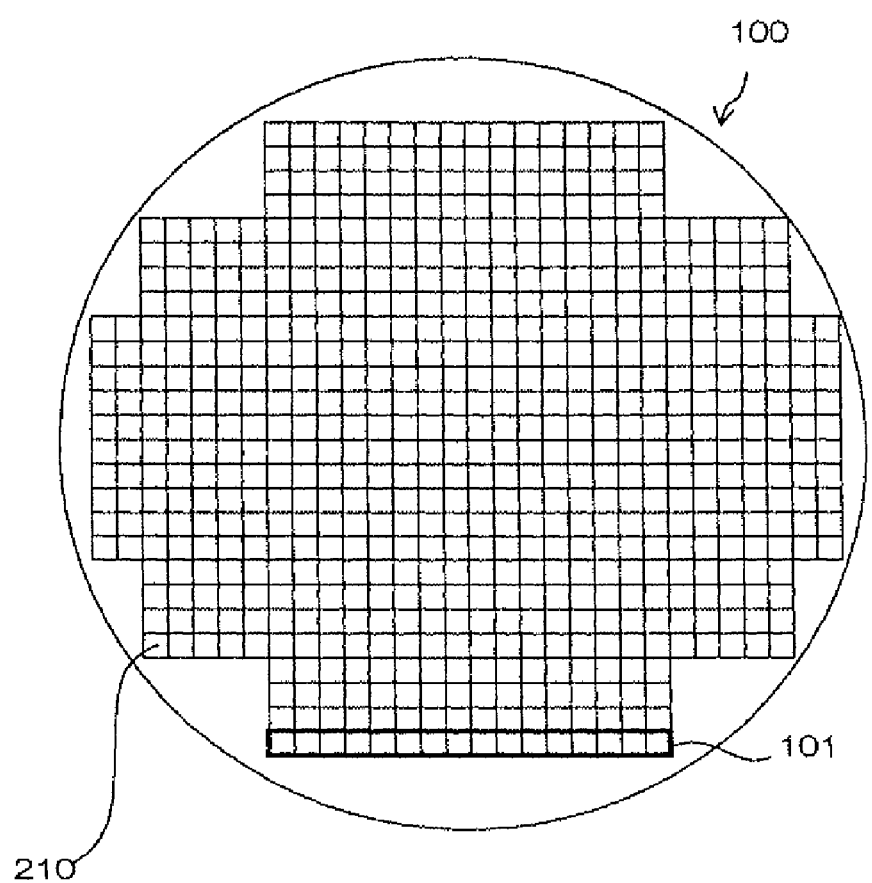
FIG. 15 is a plan view of a wafer relating to manufacturing the magnetic recording element of the present invention.

Next, a wafer to be used for manufacturing the magnetic recording element is explained. With reference to FIG. 15, at least stacks 210 forming the magnetic recording element 5 are formed on a wafer 100. The wafer 100 is divided into a plurality of row bars 101. The row bar 101 is a working unit during the lapping process of the air bearing surface S.

Figure 16:
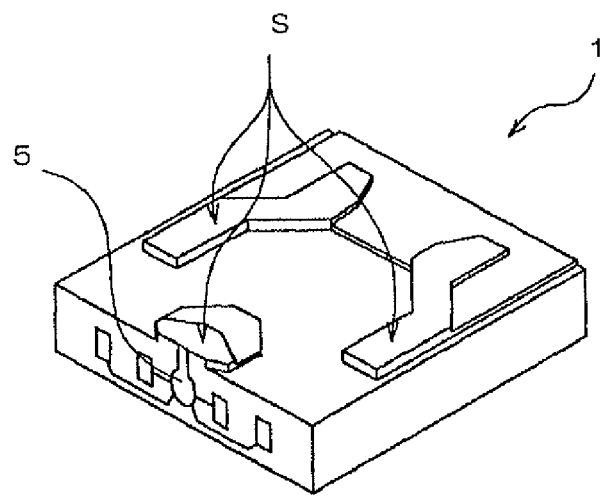
FIG. 16 is a perspective view of the slider of the present invention.
Figure 17:
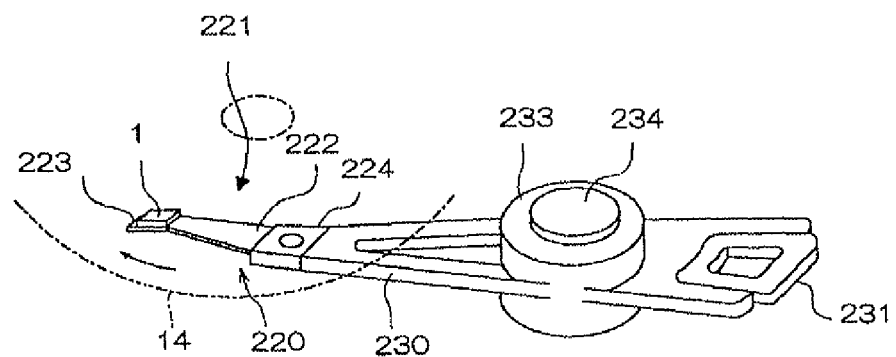
FIG. 17 is a perspective view of the head arm assembly including the head gimbal assembly where the slider of the present invention is incorporated.

With reference to FIG. 16, the slider 1 is almost hexahedral, and one surface out of them is the air bearing surface S, which faces the magnetic recording medium 14. With reference to FIG. 17, a head gimbal assembly 220 is equipped with the slider 1 and a suspension 221 elastically supporting the slider 1. The suspension 221 has a plate-spring load beam 222 made of stainless steel, a flexure 223 established at one end part of the load beam 222 and a base plate 224 placed at the other end part of the load beam 222. The slider 1 is joined with the flexure 223, and provides an appropriate degree of freedom to the slider 1. A gimbal part for keeping the posture of the slider constant is established at a portion of the flexure 223 where the slider 1 is mounted.

The slider 1 is arranged within a hard disc device so as to face the disk-state magnetic recording medium (hard disk) 14 to be rotary-driven. In FIG. 17, the magnetic recording medium (hard disk) 14 is positioned at the upper side. When the magnetic recording medium 14 is rotated to the arrow direction as in FIG. 17, downward lifting force occurs to the slider 1 due to airflow passing between the magnetic recording medium 14 and the slider 1. The slider 1 flies above the surface of the magnetic recording medium 14 due to this lifting force.

A member where the head gimbal assembly 220 is mounted to the arm 230 is referred to as the head arm assembly 221. The arm 230 moves the slider 1 to the track transverse direction of the magnetic recording medium 14. One end of the arm 230 is mounted to the base plate 224. A coil 231, which becomes a portion of the voice coil motor, is mounted to the other end of the arm 230. A bearing part 233 is established in the intermediate part of the arm 230. The arm 230 is rotatably supported with a shaft 234 that is mounted to the bearing part 233. The arm 230 and a voice coil motor that drives the arm 230 constitute an actuator.

Figure 18:
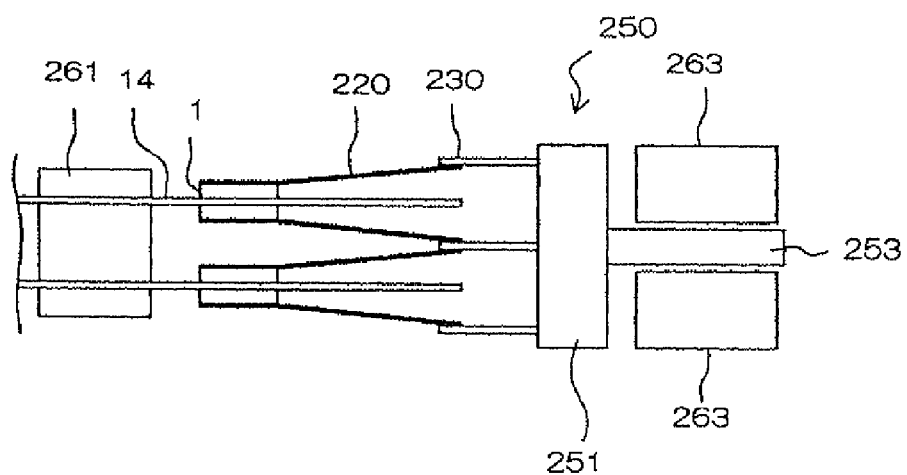
FIG. 18 is a side view of the head arm assembly where the slider of the present invention is incorporated.
Figure 19:
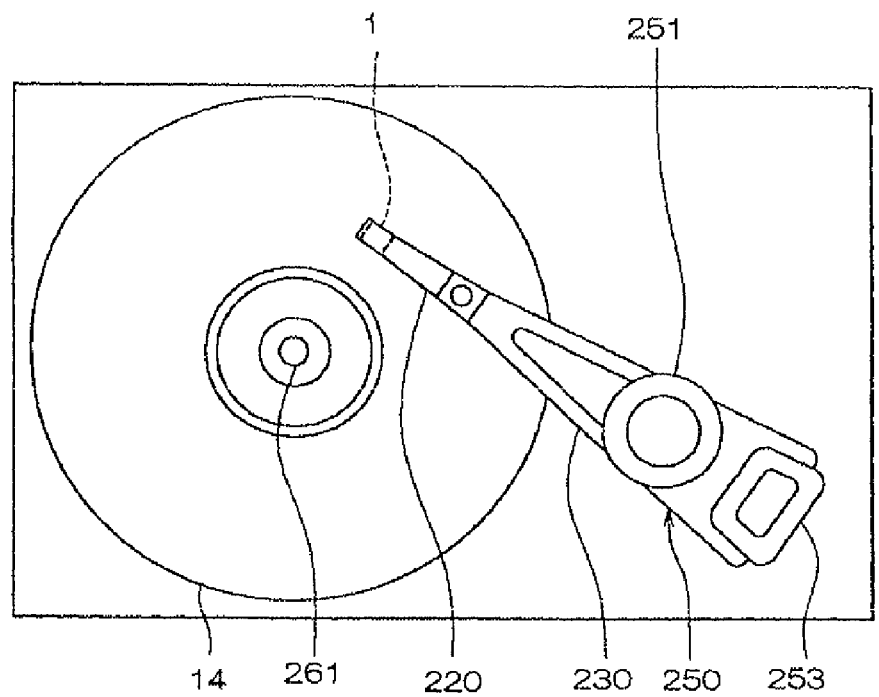
FIG. 19 is a plan view of the hard disk device where the slider of the present invention is incorporated.

Next, with reference to FIG. 18 and FIG. 19, a head stack assembly where the slider 1 is incorporated and the hard disk device are explained. The head stack assembly is a member where the head gimbal assembly 220 is mounted to each arm of a carriage having a plurality of arms, respectively. FIG. 18 is a side view of the head stack assembly, and FIG. 19 is a plan view of the hard disk device. The head stack assembly 250 has a carriage 251 having a plurality of arms 230. The head gimbal assemblies 220 are mounted to the arms 230 so as to align in the vertical direction at intervals from each other, respectively. A coil 253, which becomes a portion of the voice coil motor, is mounted to the carriage 251 at the opposite side of the arm 230. The voice coil motor has permanent magnets 263 arranged at the positions facing across the coil 253.

With reference to FIG. 18, the head stack assembly 250 is incorporated into the hard disk device. The hard disk device has a plurality of magnetic recording media 14 mounted to a spindle motor 261. Two sliders 1 are arranged in the magnetic recording media 14, respectively, so as to face across the magnetic recording media 14. The actuator and the head stack assembly 250 excluding the slider 1 support the sliders 1 and concurrently, position the sliders 1 to the magnetic recording media 14. The sliders 1 are moved to the track transverse direction of the magnetic recording media 14 by the actuator, and positioned with regard to the magnetic recording media 14. The sliders 1 record information into the magnetic recording medium 14 by a recording head, and replay the information recorded in the magnetic recording medium 14 by a reproducing head.

The desirable embodiments of the present invention were presented and explained in detail. However, it should be understood that the present invention is variously modifiable and correctable without departing from the purpose of the attached claims or the scope of the invention.

What is claimed is:

1. A magnetic recording element, comprising:
a core through which laser light can propagate in a TM mode, that has a rectangular cross section perpendicular to a propagative direction of the laser light, and through which the laser light can propagate in wave guiding modes: a fundamental mode in which only one portion exists on the cross section of the core where a light intensity of the laser light becomes maximal, and a higher order mode in which two or more portions exist where the light intensity becomes maximal;
a clad surrounding the core;
a light absorbing element in the clad, the light absorbing element being positioned away from a surface of the core perpendicular to the cross section and perpendicular to the direction in which two or more portions exist where the light intensity becomes maximal, and wherein a distance between the light absorbing element and the core is shorter than a penetration length of evanescent light in the higher order mode, but is longer than a penetration length of evanescent light in the fundamental mode; and
a main magnetic pole layer for recording positioned on an air bearing surface (ABS);
a plasmon generator extending to the ABS and facing a portion of the core, wherein the plasmon generator comprises one propagative edge extending in a longitudinal direction, and the propagative edge comprises an overlap part that overlaps with the core in the longitudinal direction, and an edge of near-field-generator positioned in the vicinity of an end part of the main magnetic pole layer on the ABS, the overlap part of the propagative edge coupling with a laser light propagating through the waveguide in a surface plasmon mode and generating surface plasmon, and the propagative edge propagating the surface plasmon generated at the overlap part to the edge of near-field-generator.

2. The magnetic recording element according to claim 1, wherein the light absorbing element extends along a longitudinal direction of the core.

3. The magnetic recording element according to claim 2, wherein the light absorbing element extends along a portion of the core where the cross section is uniform along the longitudinal direction.

4. The magnetic recording element according to claim 1, wherein the plasmon generator and the light absorbing element are positioned along a same surface of the core.

5. The magnetic recording element according to claim 1, further comprising:
a second light absorbing element in the clad which is established at a position that is opposite to the light absorbing element across the core and that is positioned away from the core, wherein
a distance between the second light absorbing element and the core is shorter than the penetration length of the evanescent light in the higher order mode, but is longer than the penetration length of the evanescent light in the fundamental mode.

6. The magnetic recording element according to claim 1, wherein the core is made from tantalum oxide.

7. The magnetic recording element according to claim 1, wherein an extinction coefficient of the light absorbing element is three or greater.

8. The magnetic recording element according to claim 7, wherein the light absorbing element is made from cobalt iron.

9. The magnetic recording element according to claim 1, wherein the distance is between 0.25 μm and 1.2 μm.

10. The magnetic recording element according to claim 1, wherein a width of the light absorbing element is greater than a width of the core.

11. The magnetic recording element according to claim 1, wherein a thickness of the light absorbing element is 0.1 μm or greater.

12. A slider having an almost hexahedral shape, the slider comprising a substrate and the magnetic recording element according to claim 1, the magnetic recording element being formed over the substrate.

13. A head gimbal assembly, having the slider according to claim 12 and a suspension elastically supporting the slider, wherein the suspension comprises a load beam in a form of a plate-spring, a flexure provided at one end of the load beam and a base plate placed at the other end of the load beam, the slider being joined with the flexure.

14. A hard disk device, having a magnetic recording medium, the slider according to claim 12 and an arm, wherein the arm is configured to support the slider such that the arm faces the magnetic recording medium and is rotatably configured to position the slider to the magnetic recording medium such that the arm moves the slider in a track transverse direction of the magnetic recording medium.

* * * * *